Patented Feb. 5, 1929.

1,701,075

UNITED STATES PATENT OFFICE.

ALPHONS O. JAEGER AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE.

ZEOLITE.

No Drawing.   Application filed February 27, 1926. Serial No. 91,229.

This invention relates to novel base exchange compounds or zeolites and includes processes for preparing the same.

It has been proposed in the past to prepare zeolites containing pentavalent vanadium in the form of a non-exchangeable nuclear component. According to the present invention, zeolites in which quadrivalent vanadium is present in a non-exchangeable form possess many remarkable advantages for use as catalysts and for other purposes.

The vanadium zeolites of the present invention containing quadrivalent vanadium in a non-exchangeable form with or without pentavalent vanadium, also in a non-exchangeable form, are quite different chemically and physically from the known vanadium zeolites in which the vanadium is present in an exchangeable form or in which pentavalent vanadium alone has been introduced in a non-exchangeable form. The effectiveness of the vanadium zeolites of the present invention as catalysts and for other purposes is very much greater than that of zeolites in which quadrivalent vanadium is not present in non-exchangeable form.

The products of the present invention can be prepared by producing artificial zeolites by causing soluble compounds of quadrivalent vanadium to react with soluble salts of silicic acid under suitable conditions and in the correct proportions. The quadrivalent vanadium in the zeolites thus produced is a non-exchangeable component and the zeolites of the present invention may be considered to have one of the following empirical formulæ in which MeO represents an exchangeable base:

1. $(MeO)_y V_2O_4 (SiO_2)_x (H_2O)_z$
2. $(MeO)_{xy}(V_2O_5)(V_2O_4)(SiO_2)_{2x}(H_2O)_{2z}$
3. $(MeO)_{xy}(V_2O_4)(V_2O_3)(SiO_2)_{2x}(H_2O)_{2z}$

The group MeO, as is usual in zeolites, can be substituted partially or wholly by other exchangeable bases introduced simultaneously or successively. The base exchange bodies, however, do not give up the trivalent, quadrivalent or pentavalent vanadium components which are present in non-exchangeable form. The novel zeolites containing non-exchangeable quadrivalent vanadium may, therefore, possess one or more of the known exchangeable bases in place of the common alkali or alkaline earth metal bases of ordinary zeolites. The invention is not limited to zeolites containing any particular exchangeable base or combinations of exchangeable bases. The non-exchangeable nucleus containing quadrivalent vanadium or quadrivalent and pentavalent vanadium may also contain one or more other groups which may be of the most various character and such products are included within the scope of the present invention.

The $SiO_2$ group in the non-exchangeable nucleus of the zeolites which will be referred to hereafter as the acid group can be partly substituted by other groups or mixtures of groups, as is known in zeolite chemistry in connection with ordinary zeolites. The invention includes zeolites containing quadrivalent vanadium as a non-exchangeable component in which the nuclear acid, $SiO_2$, has been partly substituted by one or more other acid groups.

Vanadyl zeolites with or without partly substituted acid groups may, of course, contain any known exchangeable bases or mixtures in the exchangeable portion of the molecule. Among such bases are: lithium, sodium, potassium, rubidium, caesium, beryllium, magnesium, calcium, strontium, barium aluminum, titanium, zirconium, tin, lead, copper, silver, gold, zinc, cadmium, mercury, iron, cobalt, nickel, vanadium, thorium, bismuth, chromium, uranium manganese, rare earth elements, platinum metals such as platinum, palladium, etc. The elements can be present as simple or as complex ions and innumerable combinations of elements are, of course, possible and all are included in the present invention.

In addition to quadrivalent vanadium, the non-exchangeable nucleus of the zeolites can contain pentavalent vanadium or trivalent vanadium or one or more of the elements copper, gold, silver, bismuth, beryllium, zinc, cadmium, boron, aluminum titanium zirconium, tin, lead, thorium, chromium, molybdenum, tungsten, uranium, manganese, iron, nickel, cobalt, osmium and rare earth elements.

The elements may be present as simple or complex ions containing one or more of the elements. They may be in the form of the metallates or as acid or neutral salts. The combination and choice of the elements, of course, will depend on the use to which the zeolite is to be put. We do not claim, however, in this application the use of easily decomposible complex compounds of the elements which are to be introduced into the nucleus broadly, this forming the subject matter of another application, and in the present application the introduction of various elements into the non-exchangeable nucleus of the zeolites by means of easily decomposible complex compounds of the elements is claimed only in connection with the production of zeolites containing quadrivalent vanadium in non-exchangeable form.

The acid group of the zeolite nucleus, that is to say the silicic acid group, can also be substituted in part by other inorganic acids such as the acids of phosphorus, sulphur, nitrogen, tin, titanium, tungsten, chromium, uranium, arsenic, antimony, manganese, and the like, the particular acid or mixture of acids and the proportions depending, of course, in each case, on the use to which the final product is to be put.

It is frequently desirable to dilute the zeolites with other bodies which may be inert or which may possess catalytic or other activity due either to their physical structure, (porosity, subdivision, mechanical strength, crystalline structure, etc.), or due to their chemical composition. Some diluent bodies also appear to act as activators in certain catalytic reactions, that is to say, while they themselves possess little or no catalytic power they greatly enhance the catalytic efficiency of zeolites. The diluents may be added at any stage of the preparation of the zeolites of the present invention and the resulting products, particularly those in which the zeolites are very homogeneously and minutely distributed among the diluents, frequently possess remarkable properties and are included in the present invention.

The choice of diluents is very extensive and depends, of course, on the conditions and technical requirements which arise in the different uses to which the zeolites of the present invention are put. In the following paragraphs a few diluents will be mentioned for particular purposes but it should be understood that these are only typical examples of bodies which may be used as diluents and in no sense limit the invention:

1. Among the diluents which may be added to the zeolites of the present invention, when these latter are to be used for softening and purification of water are the following: all kinds of kieselguhrs, particularly cellite earths, fuller's earth, pulverized natural or artificial zeolites, rocks and other minerals, tuffs and other rocks of volcanic origin, greensand, glauconite, slag wool, cements, silica gel, filter stones, pulverized clay, manganese dioxide, pulverized carbon, various kinds of coke, wood charcoal, artificial charcoal, soot or lamp black, charred humus, animal charcoal, sugar charcoal, etc. The addition of these and other similar diluents increases the porosity and the purifying power of the zeolites to a very considerable extent so that the filtration speed can be very considerably increased and the period of regeneration can correspondingly be shortened.

2. The following diluents are illustrations of materials which can be added to the zeolites of the present invention to enhance their effectiveness as catalysts. The diluents mentioned under paragraph 1 can be used, the choice depending on the particular catalyses, and fragments of minerals and rocks rich in quartz or the pulverized materials can also be used. In addition pumice meal, asbestos, mica flakes, powdered glass, graphite, metal powders, metal alloy powders and compounds or minerals which contain catalytically active elements or elements which behave as activators in a particular process such as, for example, metal oxides, hydroxides, carbonates, sulphates, difficultly soluble nitrates. silicates, tungstates, uranates, chromates, vanadates, manganates, ferrates, molybdates, phosphates, aluminates, plumbates, metal compounds which are difficultly soluble in water and alkalies, metallides, hydrides, carbides, silicides, sulphites, sulphides, nitrides, insoluble organic compounds of the catalytic elements, insoluble ammonium complexes, radio active bodies, etc.

3. When zeolites are to be used for the purposes of purifying gases or for gas absorption or for gas separation, a process for which, both in the cold and at elevated temperatures, with or without pressure, dry or damp, they are particularly suited, the various diluents mentioned under 1 and 2 may be used where they do not interfere with any particular process which is to be carried out. In addition finely divided metals, metal oxides and suboxides, which themselves are powerful gas absorbers or which are capable of uniting chemically with compounds in the gases, may be used. Examples of such metals are platinum, palladium, nickel, cobalt, copper, iron, rhodium, ruthenium, osmium, iridium, chromium, magnesium, silver, aluminum. Oxygen carriers such as oxides of chromium, manganese, vanadium, can be incorporated into the zeolites during their formation or may be mixed or kneaded in the gelatinous products. Where the zeolites are to be used for removing from gases contact poisons of various kinds, such as sulphur, selenium, tellurium, arsenic and volatile metal compounds, a purpose for which the zeolites of the present invention are unusually well suited, diluents may be added which themselves aid in the removal of these poisonous elements or compounds. Such bodies are colloidal metals, metal oxides, hydroxides and carbonates, such as iron hydroxide, silver oxide, zinc oxide and oxides and carbonates of the alkaline earth metals, chromium oxide, lead oxide and the like.

4. Zeolites containing quadrivalent vanadium which are to be used for the adsorption of solid bodies from suspensions or colloidal solutions, a purpose for which the zeolites of the present invention are also peculiarly adapted, various absorption media can be homogeneously mixed or colloidally combined with the zeolites and enhance their adsorptive power to a very considerable extent. These diluents or additional colloids include all of the substances enumerated in paragraph 1 and in addition such materials as peat, substances rich in humins, soaps and soap-like bodies, tannin substances, saponins, protective colloids of all kinds, pulverized organic material, such as cellulose, wool, cotton, pulverized wood and the like. Vanadyl zeolites associated with these diluents are included within the scope of the present invention.

The introduction of diluents can take place in various ways, for example, purely mechanical mixtures may be made or the diluents can be added to components used in the preparation of the zeolites and for many purposes this method is very desirable, as it assures a very homogeneous and intimate mixture. Chemical combinations, colloidal combinations, absorptions and similar combinations of the zeolites with the diluents may also be used and are included in the invention. Frequently even a purely mechanical mixture will produce such an intimate admixture for instance by superficial silicification, that the mechanical mixture may and frequently does, behave as if it were a homogeneous body. In all cases, the diluent should be distributed through the mixture to form a very uniform and integral portion of the physical structure of the zeolite. In many cases the diluents, which may themselves possess little or no mechanical strength such as, for example, many colloidal bodies, when suitably mixed and incorporated in the zeolites of the present invention, form mechanically strong and solid structures of extraordinarily high porosity and indestructibility without losing their effective surface. In this way a coagulation or lumping of finely divided particles is prevented and loss through dusting or through flotation is avoided. In short, many colloidal bodies are transformed into mechanically useful structural forms. In the case of fine powders such mechanical strength is a prime essential when they are to be used in conjunction with rapid gas flows or liquid flows.

As has been pointed out in the previous paragraph, finely divided diluent bodies can be introduced into the framework of the zeolite without losing their effective surface and the curious opalescent and honey-combed structure of the zeolites permits the ready access of gases and liquids to the diluents which are distributed in them and in this way the diluents are effective in a very evenly and finely divided form. We are of the opinion that this physical characteristic of zeolites is one of the important reasons why frequently the effect of zeolites mixed with diluents is often considerably greater and frequently of a different nature than the effect of either the zeolite or the diluents taken by themselves.

The increase of efficiency of many diluted zeolites, particularly in catalytic reactions, is probably due to a large number of contributing causes and the invention is not limited to any particular chemical or physical theory of action of the vanadyl zeolites. We are of the opinion, however, that the presence of diluents which have strong absorptive or adsorptive powers, probably aids in catalyses in both gaseous and liquid phase, due to the fact that they tend to absorb or adsorb the liquid or gaseous components or in some cases, solid components, and thus bring a higher concentration of reactive components into contact with a very large surface of the catalysts proper. This effect may take place where the adsorptive or absorptive ingredients of the contact mass are either embedded in the catalytic material or surround it. Of course, we do not know the precise course of reaction in the exceedingly fine pores of the diluted zeolites and the above explanation is given merely as the most probable one to explain the great efficiency of some of the products of the present invention and the invention itself is in no sense to be considered as limited to this explanation or to any other chemical theory.

The incorporation of diluents with vanadyl zeolites of the present invention is in no sense limited to the cases where the zeolite may be considered as the dispersing medium and the added diluent as the disperse phase. The contrary arrangement where the zeolite is the disperse phase and the diluent the dispersing medium, is also included and for some purposes the novel products in which the zeolite is in the disperse phase are desirable and possesses important advantages. The distribution may also be a mixed one; thus the zeolite may be dispersed in one component of the diluent, whereas another component of the diluent is itself dispersed in the zeolite and various other combinations in which the zeolite may be present partly in a disperse phase and partly as a dispersing agent, are included in the present invention. For example, it is possible and frequently advantageous to introduce the zeolite during formation into the highly porous crystal skeleton of various minerals or in solid amorphous bodies of honey-comb, sponge or foam-like structure. The introduction may be effected by impregnating pumice, kieselguhr, volcanic rock, asbestos, unglazed porcelain, earthenware fragments, various kinds of carbon such as artificial carbon, coke, activated carbon, animal charcoal, humus charcoal and the like, with the components of a base exchange body. The zeolite is thus formed in situ in a very homogeneous and finely divided form. Instead of impregnation the introduction either of the finished zeolite or its components may be by pressing, kneading or coating of the diluent bodies which, in some cases, may advantageously have been subjected to preliminary treatment with a vacuum in order to remove gases from the pores. Products of very efficient and desirable physical structure may be produced in this manner. For example, in the catalytic oxidation in organic and inorganic compounds by vanadyl zeolites of the present invention, the surprising result may be noted that with a catalyst produced by impregnating or otherwise introducing the zeolite into pumice, kieselguhr or the like, the same volume of contact mass will often give yields equal to the concentrated catalyst, although the actual amount of catalytically active material in the diluted catalyst may be extremely small.

The many modifications made possible by varying dilutions of the zeolites of the present invention make it possible to bring about a very useful and a very fine control of catalysts by damping their activity so that any desired product may be produced with a maximum yield and a minimum of undesired by-products. This is particularly noticeable in some of the oxidations of organic compounds in the vapor phase where it is of great importance to moderate the activity of the catalyst in order to prevent the reaction from proceeding too violently or too far. Excellent yields of very pure intermediate products which are desired can be obtained by a suitable damping of the catalytic activity of vanadyl zeolites of the present invention through a well chosen degree of dilution and by the choice of suitable diluents.

From the foregoing it will be apparent that the dilution of vanadyl zeolites of the present invention frequently brings about remarkably different results from those which may be obtained with the undiluted products. Thus, one may properly think of the diluted zeolites as new products and these novel products are included within the scope of the invention.

In general, it should be remembered that the vanadyl zeolite of the present invention partake of many of the characteristics of ordinary zeolites and it should not be forgotten that their chemical behavior is largely influenced by their composition which is that of polysilicates, frequently of very high molecular weight. Owing to the polysilicate characteristic of most zeolites a very large number of different compounds can be produced which contain quadrivalent vanadium in the nucleus. The proportions of $V_2O_4$ with or without $V_2O_3$ or $V_2O_5$ and $SiO_2$ can be varied within wide limits. The exchangeable bases present can be of the most varied character and as has been pointed out the $SiO_2$ group which may be considered as the acid component of the nucleus can be substituted partly by other acids, the proportions varying within wide limits. The particular constitution of the zeolite will, of course, be chosen in accordance with the use to which it is to be put.

The chemical constitution of the zeolites of the present invention can be that of aluminum double silicates or analogous bodies in which the aluminum can be substituted by other groups, $SiO_2$ can be partly substituted or they may also be in the form of aluminosilicates, that is to say, bodies in which aluminum forms a part of the acid component of the nuclear complex. This latter type of zeolite is capable of very rapid and far reaching base exchange and is very suitable type where rapid base exchange is desired. The zeolite of the alumino-silicate type may, of course, also have its nuclear component substituted partly or wholly by other components either acid of basic and in this manner compounds analogous to the alumino-silicate zeolites can be produced in large and varied number. Where zeolites of a lower base exchange power are satisfactory zealites of the aluminum double silicate type or their analogues may be used.

In the examples which follow, various methods of preparing particular zeolites will be given in greater detail. It should be understood, however, that the methods are illustrations only and other methods which have been applied to the production of zeolites which do not contain the vanadyl group, some of which methods have been described in the literature, can be applied with suitable changes to produce the vanadyl zeolites of the present invention. Owing to the great molecular complexity of the zeolites and particularly owing to the enormous number of combinations of different substituent elements which can be introduced in non-exchangeable form, it is impossible to describe all the various production methods and modifications in detail and it will be clear to the skilled zeolite chemist how to produce vanadyl zeolites having certain desired characteristics for any particular purpose for which the products are to be used and the invention is not intended to be limited in any way to the particular methods or to the particular products which are to be described in detail in the examples. These examples are illustrations of some of the many types of products which can be made according to the present invention.

The strength of solutions used in preparing vanadyl zeolites by wet methods may vary greatly. The common methods of preparing zeolites which do not contain the vanadyl group involve the use of relatively dilute solutions of the zeolite components and for very many vanadyl zeolites of the present invention these methods, using dilute solutions, are excellently suited. For some purposes, however, it is desirable to produce zeolites of different characteristics and in different ways and concentrated solutions of the initial components of the zeolites may be used and are advantageous in many cases, particularly where the zeolites are to be used as catalysts and while the ordinary methods of zeolite chemistry can be applied for the preparation of many of the new vanadyl zeolites, modifications using more concentrated solutions of the initial components may be desirable in many cases, and these modifications constitute features of the present invention in some of its more specific aspects.

The precipitation of vanadyl zeolites, when prepared by wet processes, frequently takes a long time owing to the colloidal and gelatinous character of the products. In order to increase the speed of precipitation various indifferent neutral salts can be added to bring about a "salting out" effect. Examples of such indifferent salts which can be used are sodium sulphate, potassium chloride and the like. Of course, the particular salt chosen will depend largely on the character of the zeolite produced and may also depend on the use to which the zeolite is to be put and on the degree of washing which is to be used. Thus, where the zeolite is to be very thoroughly washed, the indifferent salt which is for salting out, can be one of a very wide choice, whereas when the zeolite is not to be thoroughly washed, the choice of the indifferent salt may be very much more limited as considerable amounts of the salt will remain in the zeolite and must be of such a character as to produce no injurious effects in the reactions in which the zeolite is subsequently to be used. Instead of salting out it is frequently advantageous to precipitate under pressure in autoclaves and other procedures may be desirable in same cases.

Too strong an alkalinity of the reaction mixture may inhibit the precipitation of the zeolites in many cases and an addition of a moderate amount of inorganic or organic acids in liquid or gaseous form or acid salts may be made in order to sufficiently neutralize the alkalinity of the reaction mixture to bring about a satisfactory and rapid precipitation. The choice of acid or acid salt to be used, of course, will also depend on the characteristics of the zeolite, the conditions under which it is to be used and the degree of purification employed. Thus, where the zeolite is very thoroughly washed out, the choice of neutralizing agent is a much wider one than where incomplete washing is to be used. In general, as with salting out processes, the particular acid to be used must be so chosen as to avoid the presence of undesirable products in the finished zeolite and the choice will therefore, of course, be dictated in large measure by the uses to which the zeolite will be put and by the particular conditions of production.

The introduction of diluents has a further advantage that their presence tends to produce easily filtrable precipitates when the diluents are added during the production of the zeolite. When no diluents are present the zeolites frequently come down in the form of a slimy, mucilaginous precipitate which is very difficult to filter. The precipitated diluted zeolites, after suitable washing, can be dried at temperatures preferably below 100° C. in order to produce the desired degree of mechanical strength. Some zeolites even when diluted are not sufficiently strong mechanically and in some cases their efficiency, particularly as catalysts, depends on an accurate proportion of alkaline groups and $SiO_2$ in the molecule, it being possible to regulate the catalytic activity in a positive and accurate manner by varying the proportions. In order to increase the mechanical strength of such zeolites and to correct the proportions of alkali and $SiO_2$ it may be desired in some cases to wash with a dilute water glass solution instead of with water. When this procedure is adopted the water glass tends to silicify the surface of the precipitated zeolites and greatly increases their mechanical strength.

The preparation of vanadyl zeolites of the present invention by wet methods usually results in the production of mother liquors which may contain considerable amounts of salts formed during the reaction. These mother liquors in some cases may be of little or no value and can be thrown away, whereas, in other cases, it may be desirable to use the mother liquors or part of them, as solutions for fresh batches or as raw material to prepare certain components which enter into the reaction. Many combined methods are possible in which mother liquors from one batch are used to prepare another.

Instead of using wet methods the vanadyl zeolites of the present invention which may or may not also contain $V_2O_3$ or $V_2O_5$ in nonexchangeable form, can be produced by fusion processes in which a melt is reduced with various reducing agents such as carbon, metal powders (for example, zinc dust) organic substances such as oxalic acid, sugar, &c. Reducing gases, such as hydrogen and the like, may also be utilized and can be efficiently applied by passing the gases through the melt, where the latter is sufficiently fluid to make this procedure possible. When starting with $V_2O_5$ as a raw material, the reduction can be carried part-way by a suitable choice of amount and character of the reducing agent, so that the reduction is controlled both quantitatively and qualitatively and quadrivalent vanadium can be produced, either alone or in admixture with trivalent or pentavalent vanadium in any desired proportion. This method of determining the proportions is particularly important, as it is not necessary to introduce a number of separate materials and the products can be produced very cheaply and of an excellent uniform quality. The reduction of the vanadium compounds in the fused state to produce zeolites containing quadrivalent vanadium with or without the presence of vanadium at other stages of oxidation, constitutes one of the new and improved features of the present invention which, however, is not limited to this method of preparation.

Concentrated or diluted vanadyl zeolites with or without trivalent or pentavalent vanadium in non-exchangeable form, produced either by wet methods or by fusion methods, may be subjected to a subsequent treatment with acids or acid yielding substances to introduce acid radicals in loose combination with the zeolite forming soluble, insoluble or difficulty soluble compounds. These added acid radicals open up a large field of new zeolite products which are of great value for many purposes, for example, liquid and vapor phase catalyses, catalytic purification of gases, gas absorption, separation of gases, and the like. The chemical composition of these acid treated vanadyl zeolites is different from that of the zeolites which have not been subjected to the acid treatment. The acid radical itself is combined with the zeolite in such a form that the product is ionizable and an acid radical so introduced behaves very differently from other acid radicals or even from the same acid radical present in the nucleus of the zeolite in non-exchangeable form. The exact chemical combination is, of course, not known to us but it seems very probable that the zeolites which may be considered as complex compounds form salts with the acids. Whether the salt formation is with the bases present in exchangeable form or those in non-exchangeable form, we have not as yet been able to determine definitely and for the purposes of the present invention and for the most, if not all of the uses to which the zeolites are to be put, it is not material just how the acid radicals are combined with the zeolite molecule itself. Naturally, this phase of the invention is not limited to any theories of the chemical constitution of the products produced.

Owing to the possibility of introducing a very large number of different acid radicals which may be themselves catalytically active or which may be activators or stabilizers of other catalytic elements or groups present in the zeolite molecule, the vanadyl zeolites combined with acid radicals are particularly important for mixed contact masses where a very fine proportioning of different catalytic elements is desirable. In many catalytic reactions, such as, for example, the catalytic oxidation of organic compounds and in particularly sensitive reduction catalyses such as the reduction of oxides of carbon to oxygen containing compounds and of aldehydes to alcohols, the finely tuned vanadyl zeolites which have been combined with an acid radical find an important use and open up to the catalytic chemist a new field of mixed catalysts which permits a very fine control of the reaction.

Almost any organic or inorganic acids or salts can be used to introduce acid groups into the zeolite molecule to form salt-like bodies. Of course, the choice of the particular acid radical or the particular acid radicals in case more than one is introduced into a single zeolite, depends on the purpose for which the zeolite is to be used. For example, the acids of salts of vanadium, tungsten, niobium, antimony, selenium, tellurium, arsenic, phosphorus, titanium, bismuth, aluminum, lead, tin, zinc, sulphur, chlorine, platinum, boron, zirconium, thorium, or the corresponding poly-acids and complex anions may be used. Complex mixed anions such as, for example, ferro and ferricyanogen radicals, sulphocyanogen compounds, other metal cyanogen complexes, metal ammonium complexes and the like, may be introduced wherever they are capable of forming preferably difficultly soluble compounds with the exchangeable bases of the zeolite molecule. When insecticidal preparations are desired in addition to some of the acids enumerated which have insecticidal properties, hydrocyanic acid, acids of arsenic and phenols may also be used. Naturally various combinations of two or more acid groups may also be introduced, either simultaneously or successively.

The amount of acid radicals can be quantitatively regulated so that the zeolites produced may be of acid, neutral or basic character. Mixtures of different zeolites, some having acid, some having basic or some having neutral reactions may also be used where such mixtures may prove desirable and various combinations and mixtures of zeolites with varying amounts of acid and also mixtures of acid-treated zeolites and untreated zeolites are included within the scope of the present invention.

The invention will be further illustrated by the following specific examples, which describe the production of certain typical vanadyl zeolites embodying the features of the present invention. These examples are typical illustrations only and the invention is in no sense limited to them. Particularly the invention is not limited to the combinations of features shown in any particular example. The examples have been chosen to illustrate as many as possible of the features of the present invention in a minimum number of examples and they should not be taken to means that a particular combination of features shown in one example is necessarily always to be followed, as other combinations are equally possible and for some purposes may be more desirable. On the other hand, some of the specific examples illustrate particular vanadyl zeolites which we have found to be unusually effective for certain purposes and such specific zeolites are, of course, to be included in the invention in some of its narrower aspects.

*Example 1.*

1. 16.2 parts of vanadic acid are dissolved in a concentrated aqueous solution containing 10.2 parts of KOH and the solution is then diluted with 250 parts of water heated to boiling and a rapid stream of $SO_2$ is passed through, the color changing from green to blue and a small amount of bluish white potassium vanadyl sulphite precipitating out. The excess $SO_2$ is removed by boiling and KOH is cautiously added until the potassium vanadite is formed in a clear brown solution.

2. 140 parts of potassium silicate of 33° B. are diluted with 500 parts of water.

Solution No. 1 is poured into solution No. 2 or vice versa, and the mixture warmed gradually to about 60° to 70° C. whereupon dilute sulphuric acid is added in small portions until the whole mass first solidifies to a grayish green gel and on further stirring is changed to an easily filterable granular precipitate. The final product should be weakly alkaline. The precipitate is permitted to settle, decanted, pressed and washed with water. The pressed cake is then dried below 100° C. and the potassium vanadyl zeolite thus produced is broken into fragments which are hard light gray bodies having a conchoidal fracture and possessing good base exchange properties. In a finely pulverized condition the product is well suited as an insecticidal preparation. If the fragments are heated to 400-500° C. in a stream of burner gases for some time an excellent contact mass for the production of sulphuric acid is produced.

Instead of producing a straight base exchange vanadyl silicate 60 to 80 parts of celite is stirred into either solution 1 or 2 and after bringing the two solutions together a diluted potassium vanadyl silicate is produced which is dehydrated in a stream of hot air and given a preliminary treatment with acid vapors. The product is an excellent catalyst for the oxidation of sulphur dioxide to sulphur trioxide and for the vapor phase oxidation of naphthalene to phthalic anhydride and is also suitable as a catalyst in liquid phase as, for example, the oxidation of hydroquinone to quinone in a nitric acid solution.

The concentrated or diluted zeolite may be treated by trickling a solution of silver nitrate or copper sulphate or nitrate over it in order to produce a copper or silver vanadyl zeolite. A molecular mixture of silver and copper salts may also be used to produce a mixed copper-silver vanadyl zeolite. These products are excellent contact masses for the oxidation of methyl alcohol to formaldehyde.

Further, the copper-silver vanadyl zeolite may be treated with chromic acid or uranic acid or with a mixture in order to produce either the chromate or the uranate or the mixed chromate-uranate of the copper-silver vanadyl zeolite. These products, after treatment with hydrogen at an elevated temperature are good contact masses for the reduction of oxides of carbon by means of hydrogen at high pressures and at temperatures of 250° to 400° to produce oxygen containing reduction products, particularly methyl alcohol.

*Example 2.*

1. 16 parts of vanadium pentoxide are made into a slurry with 300 parts of water and acidified with sulphuric acid. The suspension is heated to boiling and a vigorous stream of $SO_2$ is passed through the hot solution producing in a short time a blue solution of vanadyl sulphate. After removing the dissolved $SO_2$ by boiling, an alkali metal carbonate solution is added to precipitate out vanadyl hydroxide. The precipitate is washed until the wash water gives no reaction for the $SO_4$ radical and is then dissolved in alkali to form a coffee colored solution.

2. 19 parts of chrome alum or a corresponding amount of chromium nitrate are dissolved to a clear green solution with a minimum quantity of alkali.

3. 170 parts of commercial water glass solution of 38° Bé. are diluted with 250 parts of water.

Solution 1 followed by solution 2 is rapidly poured into solution 3 with vigorous stirring and gentle warming. Acetic acid or formic acid is cautiously added to cause the solution to gelantinize, the precipitate is washed and dried and the potassium-chrome-vanadyl zeolite obtained is an excellent catalyst for all kinds of oxidation catalyses. The zeolite also possesses base exchange properties. Reduction catalysts can be prepared by a suitable subsequent treatment of the potassium chrome vanadyl zeolite.

Instead of forming a concentrated chrome-vanadyl zeolite a diluted chrome-vanadyl zeolite is produced by incorporating kieselguhr, pulverized wood charcoal, pumice meal, pyrolusite, zinc dust or pulverized malachite by stirring into the water glass solution before forming the zeolite. The diluted product is then treated with cadmium or zinc nitrate or both in order to form a diluted zinc-cadmium or zinc-cadmium-chrome-vanadyl zeolite by base exchange. The products thus produced are excellent catalysts for the reduction of oxides of carbon with hydrogen containing gases at high pressures.

*Example 3.*

1. 25 mol vanadic acid are acidified with sulphuric acid and reduced with alcohol at an elevated temperature until a clear blue solution is formed. Instead of alcohol other reducing agents such as oxalic acid, citric acid, tartaric acid, sugar, formaldehyde, hydroxylamine, hydrogen, nitrous acid and the like may be used. The excess of reducing agent is removed as far as possible by boiling the warm solution and alkali metal carbonate is added. Vanadyl hydroxide precipitates out and can be washed with water until there is no test for $SO_4$. The washed precipitate is then treated with sufficient alkali metal hydroxide to dissolve it in the form of a dark brown solution.

2. 1.75 mol of copper carbonate are treated with sufficient aqueous ammonia solution to form the deep blue cuprammonium carbonate.

3. 10 mol of $SiO_2$ in the form of sodium or potassium silicate solution are diluted with 10 volumes of water and made slightly ammoniacal. Pumice meal, kieselguhr or asbestos fibres or mixtures are stirred into the solution until the mixture remains just stirrable.

Solution 2 is poured into suspension 3 with good agitation, warmed up to 65° C. and solution 1 added rapidly with further stirring. Formic or acetic acid is cautiously added until the liquid is just neutral to litmus. A copper-vanadyl zeolite precipitates out and is thoroughly washed and dried. An enhanced mechanical strength can be obtained by adding a little water glass to the wash water.

After drying, the mass is broken into fragments and possesses excellent base exchange powers. The product is also a good reduction or oxidation catalyst. When used for reductions the catalyst receives a preliminary treatment with hydrogen at 250–350° C. and is then ready for use. Nitrobenzol is reduced in a stream of hydrogen to form good yields of aniline using the above catalysts. In a similar manner crotonaldehyde is reduced to normal butyl alcohol. Aluminum or thorium can also be introduced by base exchange by using solutions of their nitrates and the substitution results in a still better reduction catalyst.

When the product is to be used as an oxidation catalyst a preliminary treatment at 400–500° C. with acid vapors and air is advantageous. The catalyst thus prepared oxidizes methane to formaldehyde, methyl alcohol and formic acid and is also useful in oxidizing methyl alcohol to formaldehyde and naphthalene to naphthaquinone and phthalic anhydride. The oxidizing effect can be still further improved by introducing silver or vanadium by base exchange using, for example, a silver sulphate or a vanadium chloride solution.

*Example 4.*

1. 16 mol of $SiO_2$ in the form of a 2N water glass solution are stirred into the thin paste with precipitated pyrolusite.

2. 1 mol of $Al_2O_3$ in the form of sodium aluminate.

3. 1 mol of CuO dissolved in ammonia water to form cuprammonium hydroxide.

4. 1 mol of ZnO dissolved in caustic soda to form sodium zincate.

5. 1 mol $V_2O_5$ is reduced to $V_2O_4$ with oxalic acid at an elevated temperature and is dissolved in alkali to form an alkali metal vanadite.

Solutions 2 to 5 are rapidly poured one after another into solution 1 with vigorous agitation, the mixture heated to 70–80° C. and small portions of formic or acetic acid until the reaction just remains alkaline. An aluminum-copper-zinc-vanadyl zeolite diluted with pyrolusite is precipitated and is washed and dried. The product has excellent base exchange characteristics and is a fine catalyst for cracking crude petroleum which is preferably free from sulphur. It is characterized by a very low tendency to form carbon and can be easily regenerated when spent by blowing with steam for a short time.

*Example 5.*

1. 8 to 10 mols of $SiO_2$ in the form of commercial water glass solution are diluted with 4 to 5 volumes of water.

2. 0.5 mols of $V_2O_4$ prepared from the corresponding ammonium vanadate in aqueous suspension by reduction with sulphur dioxide, are precipitated with alkali metal carbonate or bicarbonate solution to form vanadyl hydroxide and the washed precipitate dissolved in alkali, the product being a coffee colored liquid.

3. 1.5 mols of zinc in the form of a sodium zincate solution.

Solutions 2 and 3 are poured into solution 1 with vigorous agitation and sufficient acetic acid is added until a gelatinous precipitate comes down and the liquid remains still weakly alkaline. The dried precipitate is hydrated and a barium nitrate solution permitted to trickle over it until the base exchange is practically complete and a barium-vanadyl-zinc zeolite is obtained. The product is washed and chromic acid is gradually added in amount corresponding to the barium content. The chromic acid may be advantageously introduced in the form of sodium or ammonium chromate. The resultant chromate of the barium-vanadyl zinc zeolite is dried, pulverized and attached to fragments of pumice by means of a 5% dextrine solution. The contact mass thus produced after a reduction in a stream of hydrogen at 300–400° C. is capable of freeing gases from small traces of sulphur and sulphur compounds, both organic and inorganic. The gases are passed over the zeolite at 400–500° C. with or without pressure and the removal of sulphur is substantially quantitative so that the exit gases possess a purity which is quite sufficient for catalytic purposes.

Example 6.

Zeolites containing vanadium in non-exchangeable form and in more than one stage of oxidation can be prepared in various ways, for example—

1. 1 mol of vanadyl sulphate is reduced to the green vanadous sulphate in acid solution either electrolytically or by means of zinc dust.

2. 1 mol of vanadic acid is reduced to vanadyl sulphate in a sulphuric acid solution as has been described in the foregoing examples.

3. 8 to 9 mols of $SiO_2$ in the form of a 2N water glass solution are treated with sufficient alkali so that their alkalinity is sufficient to neutralize the acidity of solutions 1 and 2 and to provide for a slight excess alkalinity. At the same time silicic acid, pumice meal, quartz flour, etc. can be stirred in to produce a thinly fluid paste.

Solutions 1 and 2 are mixed and permitted to run into the water glass solution with vigorous stirring. The reaction mixture solidifies to a gray green mass which is pressed and the presscake broken into fragments after drying. After receiving a preliminary treatment with burner gases at 400–500° C. the product is an excellent contact mass for the preparation of sulphur trioxide from burner gases. By means of complete or partial base exchange calcium, barium can be introduced into the diluted zeolite. Vanadium can also be introduced, for example by means of vanadyl sulphate or chloride solution. Two or more of the above mentioned exchange bases can be introduced simultaneously or successively in the usual manner. In general, the introduction of alkaline earth metals, earth metals and heavy metals increases the mechanical strength of the contact mass and its resistance to high temperature. Excellent effects can also be obtained when the products after base exchange are subjected to a subsequent treatment which introduces an acid radical not in the nucleus. Such radicals may be $PO_4$, $SO_4$, and the like.

Instead of preparing the various stages of oxidation of vanadium as described above, the electrolytic reduction of the $V_2O_4$ or the reduction by means of zinc dust can be so regulated that only a portion of the $V_2O_4$ is reduced to $V_2O_3$, thus producing necessarily a mixture of different stages of oxidation.

Example 7.

A mixture of 3.6 parts of vanadic acid, 9.66 parts of finely pulverized silicic acid, 1.85 parts 90% KOH, 10 parts $K_2Co_3$, 33.8 parts borax and 2.5 parts pulverized charcoal are melted at a red heat until the evolution of carbon dioxide ceases and the melt appears homogeneous. The glassy product is poured into water and freed from boric acid by leaching. The small hard granules can be used as catalysts for the oxidation of inorganic or organic compounds, for example, the oxidation of ammonia to oxides of nitrogen, $SO_2$ to $SO_3$, anthracene to anthraquinone, etc.

Example 8.

10 mols of $SiO_2$ in the form of commercial water glass are mixed with 5 volumes of water and made weakly ammoniacal. If desired, pumice meal, nickel powder or pulverized nickel ore, pyrolusite, kieselguhr or other additional inert or catalytic bodies may be stirred into the solution.

A solution containing 2 mols of nickel in the form of nickel ammonium nitrate is stirred into the water glass and 0.25 mol potassium or sodium vanadite is added, whereupon nitric acid is introduced until the mixture becomes neutral to phenolphthalein. The sodium-nickel-vanadyl zeolite which precipitates out together with the diluents is pressed and dried.

When the product is to be used for hydrogenation or reduction the product is reduced with hydrogen at 300° C. This catalyst can be used in any catalytic hydrogenation or reduction processes in which a nickel catalyst is suitable. For example, the catalyst when broken into fragments can be used for the preparation of cyclohexanol from phenol and hydrogen in the vapor phase and similarly for the production of isopropyl alcohol from acetone or tetraline from naphthalene.

By pulverizing the contact mass it may be used in liquid phase catalyses. For example, the catalyst may be used as a fat hardening catalyst, in which case the addition of fuller's earth or animal charcoal in the base exchange body is of advantage and the fats produced by means of the catalyst are of a beautiful white color. In liquid phase hydrogenations and reductions with this catalyst the half-reaction period is shorter than with a nickel catalyst without vanadium.

The catalyst may also be treated with burner gases at 400–500° C. and then constitutes a good contact for the oxidation of $SO_2$ to $SO_3$.

Example 9.

1. 12 mols of $SiO_2$ in the form of water glass solution of 38° Bé. are diluted with 10 to 15 volumes of water and limonite or burnt pyrites mixed with an equal amount of kieselguhr is stirred into the mixture as a diluent, the amount of solids added leaving the solution still fluid.

2. 1 mol of vanadyl sulphate is precipitated with potash washed and dissolved in caustic potash to form potassium vanadite.

Solutions 1 and 2 are stirred together and 1 mol of iron nitrate solution is added. A jelly-like mass forms and on further stirring becomes finely subdivided. The product is a base exchange polysilicate diluted with iron oxide and kieselguhr and containing iron and quadrivalent vanadium in non-exchangeable form. The mass is pressed, moderately washed and dried in the usual manner. The fragments may be hydrated with water which is permitted to trickle over them and may then be treated with a solution of manganese sulphate or aluminum sulphate to effect base exchange and produce the corresponding manganese or aluminum zeolite. The product is an excellent catalyst for transforming a mixture of CO and steam into $CO_2$ and hydrogen at a temperature of about 500° C. The catalyst is relatively insensitive to catalyst poisons and shows scarcely any tendency to sinter.

Example 10.

1. 12 mols of $SiO_2$ in the form of potassium silicate are diluted with 15 volumes of water and finely powdered thorium oxide, titanium dioxide and zirconium dioxide in equal amounts are stirred in until the mixture just remains readily stirrable.

2. 1 mol $Al_2O_3$ in the form of a potassium aluminate solution.

3. 1 mol $Cr_2O_3$ dissolved in the form of a potassium chromite solution.

4. 0.5 mol $V_2O_4$ is dissolved in the form of a potassium vanadite.

Solution 1 is first poured into solution 4 and then solution 3 followed by solution 2 is poured into the mixture with vigorous agitation and gentle warming to about 60–70° C. Some dilute acetic acid is added to precipitate an aluminum-chrome-vanadyl zeolite diluted with oxides of thorium, titanium and zirconium. The product is an excellent dehydrogenation catalyst. For example, acetaldehyde is passed in a slow stream at 200–300° C. over the catalyst which is present in a deep layer and a good yield of crotonaldehyde and some hexadienal is obtained. If desired, small amounts of hydrogen or slightly acidic or indifferent gases may be mixed with the vapors of acetaldehyde. The catalyst is also effective in liquid phase and similar aldol-forming and crotonal-forming reactions can be carried out.

It will be seen that the invention includes a whole new field of catalysts containing vanadium in a quadrivalent form. The examples and descriptions have indicated a number of reactions in which the zeolites of the present invention can be used, but the invention is in no sense limited to the uses or reactions therein described and in many cases it may be desirable to use the zeolites in many ways to meet particularly unusual conditions. Thus for example, the zeolites before setting, may be molded into plates which, because of their high gas permeability, form excellent catalysts or absorbents and at the same time can be very easily mounted in suitable apparatus. Reinforcements such as wire mesh and the like may also be incorporated into molded zeolite plates in order to increase their mechanical strength.

In some cases, where it is desirous to effect a particularly accurate temperature control, heating or cooling tube or elements may also be embedded in zeolite plates. It is also desirable in many cases, particularly in catalytic reactions, to prevent contact of the reacting components with the walls of the apparatus, which frequently are made of metals having injurious effects on the reactions to be carried out. In such cases, the zeolites after formation, or while still sufficiently fluid, may be painted or coated on to the walls of converters or other similar apparatus and form a layer which protects the reaction gases or liquids from coming in contact with the walls of the apparatus, and at the same time by suitable choice of zeolites, effects a notable increase of efficiency in the reaction.

Other methods of utilizing the zeolites of the present invention will occur to those skilled in the art and are included in the invention.

In the claims the word "zeolite" covers the class of base-exchanging polysilicates in which the exchangeable bases are very easily and rapidly exchangeable. The expression "zeolite" is, however, not limited to polysilicates usually known as zeolites and includes base exchanging polysilicates and in which the exchangeable bases are only incompletely and slowly exchanged and thus includes dehydration products of both classes of base exchange compounds referred to above.

Many of the zeolites of the present invention which are used for catalytic or other purposes are subjected to preliminary treatments which may and frequently do effect secondary changes either chemical or physical, particularly on the surface of the zeolite. Thus, for example, zeolites to be used in certain catalytic processes are treated with reducing or oxidizing agents in gaseous or liquid form in the cold or in elevated temperature with or without pressure. A similar secondary chemical or physical change may frequently take place during the use of the zeolite, particularly where it is used as a catalyst. Such zeolites which have undergone secondary chemical changes, especially on the surface, are included in the present invention and are specifically to be included within the term "zeolite", as used in the claims which are accordingly not limited to such products as have suffered no secondary chemical changes.

What is claimed as new is:

1. Zeolites containing quadrivalent vanadium in non-exchangeable form.

2. Zeolites containing quadrivalent vanadium in non-exchangeable form free from substantial amounts of vanadium in other stages of oxidation.

3. Zeolites containing quadrivalent vanadium in non-exchangeable form and also containing pentavalent vanadium in non-exchangeable form.

4. Zeolites containing quadrivalent vanadium in non-exchangeable form and also containing trivalent vanadium in non-exchangeable form.

5. Zeolites containing quadrivalent vanadium in non-exchangeable form and also containing other metallic elements in non-exchangeable form.

6. Zeolites containing quadrivalent vanadium in non-exchangeable form and also containing other catalytically active elements in non-exchangeable form.

7. Zeolites containing quadrivalent vanadium in non-exchangeable form and containing bases other than alkali metal bases in exchangeable form.

8. Zeolites containing quadrivalent vanadium in non-exchangeable form and containing catalytically active bases in exchangeable form.

9. Zeolites containing quadrivalent vanadium in non-exchangeable form and containing acids other than acids of silicon in the nucleus.

10. Zeolites containing quadrivalent vanadium and being combined with acids to form ionizable salt like products.

11. Zeolites containing quadrivalent vanadium in non-exchangeable form admixed with diluents.

12. Zeolites containing quadrivalent vanadium in non-exchangeable form admixed with diluents to form a homogeneous mass.

13. Zeolites containing quadrivalent vanadium in non-exchangeable form admixed with porous diluents.

14. Zeolites containing quadrivalent vanadium in non-exchangeable form admixed with diluents having an average particle size less than 60 m.

15. Zeolites containing quadrivalent vanadium admixed with catalytically active diluents.

16. Zeolites containing quadrivalent vanadium admixed with catalytically activating diluents.

17. The process of preparing zeolites which comprises causing soluble silicates to react with quadrivalent vanadium compounds the reaction being maintained alkaline to litmus.

18. The process of preparing zeolites which comprises causing soluble silicates to react with quadrivalent vanadium compounds associated with compounds of vanadium in other stages of oxidation under conditions of alkalinity to litmus.

19. The method of preparing zeolites which comprises reducing pentavalent vanadium compounds to produce quadrivalent vanadium compounds, transforming them into soluble vanadites and causing the vanadium to react with soluble silicates the reaction being maintained alkaline to litmus.

20. The method of preparing zeolites which comprises reducing pentavalent vanadium compounds to produce a mixture containing quadrivalent vanadium compounds associated with vanadium compounds of different valence, transforming the quadrivalent vanadium compounds into soluble vanadites and causing the mixture of vanadites and other vanadium compounds to react with soluble silicates the reaction being maintained alkaline to litmus.

21. The process of preparing zeolites which comprises causing soluble silicates to react with soluble quadrivalent vanadium compounds associated with compounds of other metals the reaction being maintained alkaline to litmus.

22. The process according to claim 17 in which finely divided diluents are incorporated in at least one of the reacting components before reaction takes place.

23. The process according to claim 17 in which finely divided diluent material is incorporated with the soluble silicates prior to reaction with the vanadium compounds.

24. The method of preparing zeolites which comprises causing quadrivalent vanadium compounds to react with soluble silicates under conditions of alkalinity to litmus and causing the zeolites thus produced to exchange part at least of their exchangeable bases for bases other than alkali metals.

25. The method of preparing zeolites which comprises causing soluble silicates to react with quadrivalent vanadium compounds under conditions of alkalinity to litmus, and washing the zeolites thus produced with a soluble silicate solution.

26. The method of preparing zeolites which comprises causing soluble silicates to react with quadrivalent vanadium compounds under conditions of alkalinity to litmus and treating the zeolites thus formed with an acid to form a salt-like ionizable compound of the zeolite.

Signed at St. Louis, Missouri, this 24th day of February, 1926.

ALPHONS O. JAEGER.
JOHANN A. BERTSCH.